(12) United States Patent
Zhou et al.

(10) Patent No.: US 11,432,910 B2
(45) Date of Patent: Sep. 6, 2022

(54) SHELL-SHAPED TOOTH REPOSITIONER AND FABRICATION METHOD THEREOF

(71) Applicant: Wuxi EA Medical Instruments Technologies Limited, Jiangsu (CN)

(72) Inventors: Ketuo Zhou, Shanghai (CN); Lei Huang, Shanghai (CN)

(73) Assignee: Wuxi EA Medical Instruments Technologies Limited

( * ) Notice: Subject to any disclaimer, the term of this patent is extended or adjusted under 35 U.S.C. 154(b) by 340 days.

(21) Appl. No.: 16/636,419

(22) PCT Filed: Dec. 3, 2018

(86) PCT No.: PCT/CN2018/118937
§ 371 (c)(1),
(2) Date: Feb. 4, 2020

(87) PCT Pub. No.: WO2019/165816
PCT Pub. Date: Sep. 6, 2019

(65) Prior Publication Data
US 2020/0170756 A1      Jun. 4, 2020

(30) Foreign Application Priority Data
Feb. 27, 2018   (CN) .......................... 201810163484.X (51) Int. Cl.
*A61C 7/00*      (2006.01)
*A61C 7/08*      (2006.01)
(Continued)

(52) U.S. Cl.
CPC ................ *A61C 7/002* (2013.01); *A61C 7/08* (2013.01); *G06F 30/00* (2020.01); *G06F 30/23* (2020.01); *G06T 17/00* (2013.01)

(58) Field of Classification Search
CPC . G06F 30/00; G06F 30/23; A61C 7/08; A61C 7/002; G06T 17/00
See application file for complete search history.

(56) References Cited

U.S. PATENT DOCUMENTS 6,350,120 B1    2/2002   Sachdeva et al.
10,524,882 B2   1/2020   Caraballo
(Continued)

FOREIGN PATENT DOCUMENTS

AU    2013371950 B2    7/2014
CN     103932807 A     7/2014
(Continued)

*Primary Examiner* — Charles E Anya
(74) *Attorney, Agent, or Firm* — Forge IP, PLLC (57) ABSTRACT

In one aspect, the present application provides a method of fabricating a shell-shaped repositioner for repositioning teeth from a first tooth arrangement to a second tooth arrangement, comprising: obtaining a first 3D digital model representing the first tooth arrangement, a second 3D digital model representing the second tooth arrangement and information of restrictions on anchorage force bearing of a first tooth among the teeth; modifying the second 3D digital model based on the first 3D digital model, the second 3D digital model and the information of restrictions on anchorage force bearing of the first tooth, to obtain a third 3D digital model; and controlling an apparatus using the third 3D digital model to fabricate the shell-shaped repositioner.

9 Claims, 6 Drawing Sheets

(51) Int. Cl.
*G06F 30/00* (2020.01)
*G06F 30/23* (2020.01)
*G06T 17/00* (2006.01)

(56) References Cited

U.S. PATENT DOCUMENTS

| | | | | |
|---|---|---|---|---|
| 2011/0020761 | A1 | 1/2011 | Kalili | |
| 2013/0103175 | A1* | 4/2013 | Li | G06F 17/10 |
| | | | | 700/98 |
| 2015/0305830 | A1* | 10/2015 | Howard | A61C 7/002 |
| | | | | 433/24 |
| 2016/0135925 | A1* | 5/2016 | Mason | G16H 50/50 |
| | | | | 703/2 |
| 2016/0175068 | A1* | 6/2016 | Cai | A61C 7/002 |
| | | | | 700/98 |
| 2016/0193014 | A1* | 7/2016 | Morton | A61C 7/06 |
| | | | | 433/24 |
| 2016/0199216 | A1* | 7/2016 | Cam | A61F 5/566 |
| | | | | 128/848 |
| 2017/0231722 | A1* | 8/2017 | Boronkay | A61C 7/08 |
| | | | | 433/6 |
| 2018/0021106 | A1* | 1/2018 | Khan | A61C 7/28 |
| | | | | 433/3 |
| 2018/0168776 | A1* | 6/2018 | Webber | A61C 7/08 |
| 2018/0206940 | A1* | 7/2018 | Kopelman | A61C 7/002 |

FOREIGN PATENT DOCUMENTS

| | | |
|---|---|---|
| CN | 106901847 A | 6/2017 |
| CN | 107126275 A | 9/2017 |
| EP | 2942030 A1 | 11/2015 |

\* cited by examiner

SHELL-SHAPED TOOTH REPOSITIONER AND FABRICATION METHOD THEREOF

FIELD OF THE APPLICATION

The present application generally relates to a shell-shaped tooth repositioner and a fabrication method thereof.

BACKGROUND

Shell-shaped dental appliances such as invisible tooth repositioners and retainers made of polymer materials become more and more popular due to their advantages on appearance, convenience and hygiene. A conventional shell-shaped dental appliance is usually a one-piece shell, it forms a tooth-receiving cavity, the geometry of which substantially matches a corresponding arrangement of teeth.

An orthodontic treatment utilizing shell-shaped repositioners usually requires a plurality of successive shell-shaped repositioners. Each shell-shaped repositioner corresponds to a treatment step to reposition teeth from an initial tooth arrangement of the corresponding treatment step to a target tooth arrangement of the corresponding treatment step.

Usually, the geometry of the tooth-receiving cavity of a conventional shell-shaped repositioner substantially matches the target tooth arrangement of a corresponding treatment step. When a shell-shaped repositioner is worn on teeth, since the geometry of its tooth-receiving cavity does not match current tooth arrangement, the shell-shaped repositioner is caused to deform elastically, thereby exerting forces on corresponding teeth to reposition them to a corresponding target tooth arrangement.

In the absence of extra anchorage, while a shell-shaped repositioner exerts a repositioning force on a tooth to be repositioned, the shell-shaped repositioner exerts on other teeth a force which is equal in magnitude and opposite in direction to the repositioning force, that is to say, other force-receiving teeth become the anchorage of the tooth to be repositioned during the repositioning.

As usually the geometry of the tooth-receiving cavity of a conventional shell-shaped repositioner substantially matches the target tooth arrangement of a corresponding treatment step, when the shell-shaped repositioner is worn on teeth, forces applied on the teeth can't be controlled. In some cases, this may cause a tooth to receive an anchorage force that exceeds its tolerance, or to receive an anchorage force in a direction in which direction it shall not receive any force, thereby causing a bad effect on the orthodontic treatment.

In view of the above, it is necessary to provide a new shell-shaped repositioner and a fabrication method thereof.

SUMMARY

In one aspect, the present application provides a method of fabricating a shell-shaped repositioner for repositioning teeth from a first tooth arrangement to a second tooth arrangement, comprising: obtaining a first three-dimensional (hereinafter "3D") digital model representing the first tooth arrangement, a second 3D digital model representing the second tooth arrangement and information of restrictions on anchorage force bearing of a first tooth among the teeth; modifying the second 3D digital model based on the first 3D digital model, the second 3D digital model and the information of restrictions on anchorage force bearing of the first tooth, to obtain a third 3D digital model; and controlling an apparatus using the third 3D digital model to fabricate the shell-shaped repositioner.

In some embodiments, the information of the restrictions on anchorage force bearing of the first tooth comprises: restrictions on direction and/or magnitude of anchorage force that can be borne by the first tooth, during the repositioning of the teeth from the first tooth arrangement to the second tooth arrangement.

In some embodiments, the method of fabricating the shell-shaped repositioner further comprises: controlling an apparatus using the 3D digital models to fabricate a positive model; forming an uncut negative model on the positive model using a polymer film based on thermoplastic forming technique; and cutting off unnecessary part of the uncut negative model to obtain the shell-shaped repositioner.

In some embodiments, the method of fabricating the shell-shaped repositioner further comprises: calculating using a computer whether the shell-shaped repositioner to be fabricated using the third 3D digital model satisfies the restrictions on anchorage force bearing of the first tooth, and if no, modifying and updating the third 3D digital model based on the calculation result.

In some embodiments, the calculating is based on finite element analysis.

In some embodiments, the preset restrictions on anchorage force bearing are that received anchorage force shall be smaller than a predetermined value.

In some embodiments, the first tooth is a tooth that shall not bear excessive anchorage force.

In some embodiments, the first tooth is one of the following: a tooth with periodontal disease and an implanted tooth.

In some embodiments, the preset restrictions on anchorage force bearing are that a component in a first direction of received anchorage force shall be smaller than the predetermined value.

In some embodiments, the predetermined value is zero.

In some embodiments, the first tooth is a tooth to be repositioned, and the first direction is opposite to the reposition direction of the first tooth.

In another aspect, the present application provides a shell-shaped repositioner which is one-piece shell-shaped and forms a cavity for receiving a plurality of teeth, the cavity having a geometry that enables the repositioner to reposition the plurality of teeth from a first tooth arrangement to a second tooth arrangement, and the geometry of the cavity being configured in such a way that force received by a first tooth during the repositioning of the plurality of teeth from the first tooth arrangement to the second tooth arrangement satisfies restrictions on anchorage force bearing preset for the first tooth.

In some embodiments, the preset restrictions on anchorage force bearing are that received anchorage force shall be smaller than a predetermined value.

In some embodiments, the first tooth is a tooth that shall not bear excessive anchorage force.

In some embodiments, the first tooth is one of the following: a tooth with periodontal disease and an implanted tooth.

In some embodiments, the preset restrictions on anchorage force bearing are that a component in a first direction of received anchorage force shall be smaller than the predetermined value.

In some embodiments, the predetermined value is zero.

In some embodiments, the first tooth is a tooth to be repositioned, and the first direction is opposite to the reposition direction of the first tooth.

In some embodiments, the geometry of the cavity is configured in such a way that there is a gap between a side of the first tooth opposite to the first direction and the shell-shaped repositioner when the shell-shaped repositioner is worn on the teeth under the first tooth arrangement.

BRIEF DESCRIPTION OF THE DRAWINGS

The above and other features of the present application will be further illustrated below with reference to figures and their detailed description. It should be appreciated that these figures only show several exemplary embodiments according to the present application, they should not be construed as limiting the protection scope of the present application. Unless otherwise specified, the figures are not necessarily drawn to scale, and similar reference numbers therein denote similar components.

DETAILED DESCRIPTION OF ILLUSTRATED EMBODIMENTS

In the following detailed description, reference is made to the accompany drawings, which form a part thereof. Exemplary embodiments in the detailed description and figures are only intended for illustration purpose and not meant to be limiting. Inspired by the present application, those skilled in the art can understand that other embodiments may be utilized and other changes may be made, without departing from the spirit or scope of the present application. It will be readily understood that aspects of the present application described and illustrated herein can be arranged, replaced, combined, separated and designed in a wide variety of different configurations, all of which are explicitly contemplated and make part of the present application.

The Inventors of the present application discovered that conventional shell-shaped repositioners have the drawbacks as stated in Background. More specifically, in some cases, due to the smooth surface of an implanted tooth, the ability of a shell-shaped repositioner holding on it may be compromised, if the implanted tooth is taken as a strong anchorage, the anchorage will fail in case that the shell-shaped repositioner's ability of holding on the implanted tooth in the direction of anchorage force is insufficient, so that other teeth will bear the portion of anchorage force which the implanted tooth fails to bear, and this will cause unpredictable effect on the orthodontic treatment; in some cases, since the gingival of teeth with periodontal disease is lower, the area of periodontal tissue is smaller, and it is slow to remodel periodontal tissue, as a result, application of a large force to teeth with periodontal disease is prone to cause clinical accidents; in some cases, when a conventional shell-shaped repositioner is used for orthodontic treatment, a tooth to be repositioned might be subjected to a force opposite to the repositioning direction i.e. an anchorage force opposite to the repositioning direction, which will affect its repositioning and efficiency thereof. However, no conventional shell-shaped repositioner is optimized with respect to anchorage force to solve the above potential problems. To overcome these problems, the Inventors of the present application developed a new shell-shaped repositioner and fabrication method thereof after a lot of research work.

Figure 1:
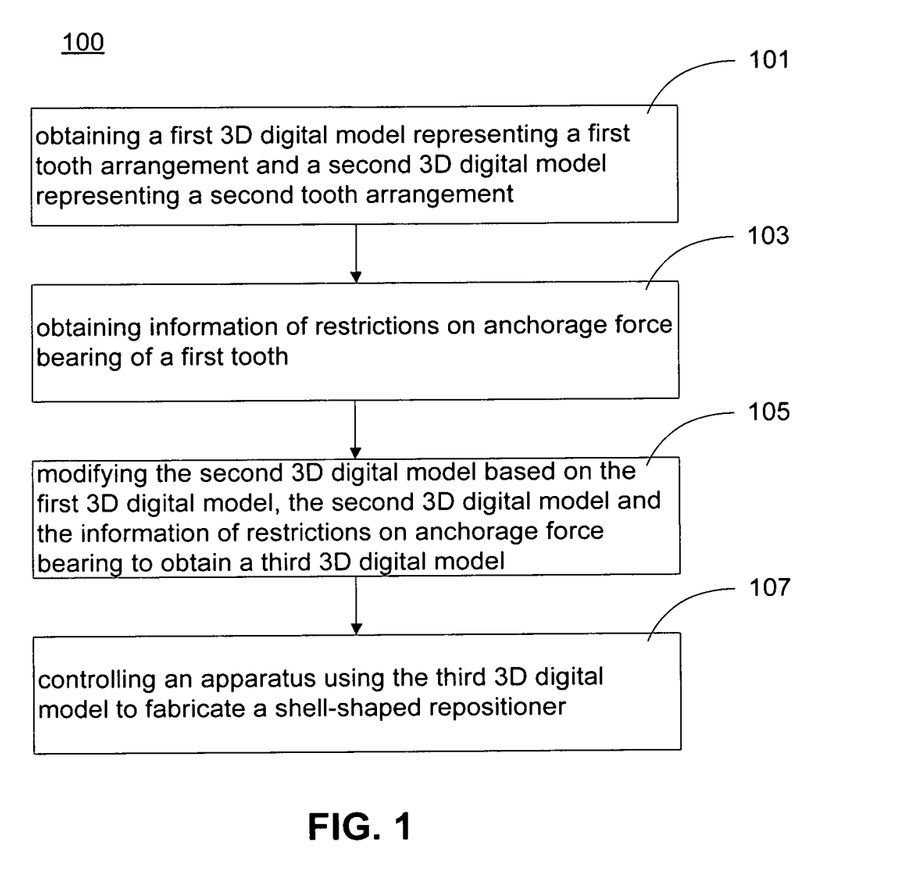
FIG. 1 illustrates a schematic flow chart of a shell-shaped repositioner fabrication method according to one embodiment of the present application.

Referring to FIG. 1 which illustrates a schematic flow chart of a shell-shaped repositioner fabrication method according to one embodiment of the present application.

In 101, a first 3D digital model representing a first tooth arrangement and a second 3D digital model representing a second tooth arrangement are obtained.

Inspired by the present application, it is understood that a 3D digital model representing a tooth arrangement may represent an arrangement of an entire dentition or a partial dentition.

In one embodiment, the first tooth arrangement may be an initial tooth arrangement of a treatment step of an orthodontic treatment using shell-shaped repositioners, and the second tooth arrangement may be a target tooth arrangement of this treatment step.

An orthodontic treatment using shell-shaped repositioners usually requires a plurality of successive shell-shaped repositioners, to incrementally reposition teeth from an original tooth arrangement to a target tooth arrangement. More specifically, a first shell-shaped repositioner is to reposition the teeth from the original tooth arrangement to a first intermediate arrangement, and a second shell-shaped repositioner is to reposition the teeth from the first intermediate arrangement to a second intermediate arrangement, and so on.

In one embodiment, successive digital data sets respectively representing successive tooth arrangements from the first intermediate tooth arrangement to a final intermediate tooth arrangement may be generated based on a digital data set representing the original tooth arrangement and a digital data set representing the target tooth arrangement. One of examples is disclosed by China patent application No. 98806354.9 entitled "Method for Manufacturing Dental Appliances for Incrementally Moving Teeth" filed by ALIGN TECHNOLOGY INC. on Jun. 19, 1998.

In another embodiment, successive digital data sets respectively representing tooth arrangements from the first intermediate tooth arrangement to the final intermediate tooth arrangement may be generated based on the digital data set representing the original tooth arrangement. One of examples is disclosed by China patent application No. 201110222246.X entitled "Method for Manufacturing Dental Appliances for Incrementally Repositioning Teeth" filed by the Applicant of the present application on Aug. 5, 2010.

In some embodiments, a 3D digital model representing a patient's original tooth arrangement may be obtained by scanning the patient's jaw directly. In some further embodiments, a 3D digital model representing the patient's original tooth arrangement may be obtained by scanning a mockup model, e.g., a plaster model (which may be fabricated based on impression) of the patient's jaw. In some further embodiments, a 3D digital model representing the patient's original tooth arrangement may be obtained by scanning an impression of the patient's jaw.

In 103, information of restrictions on anchorage force bearing of the first tooth is obtained.

In some embodiments, the restrictions on anchorage force bearing of a tooth may comprise restrictions on direction and/or magnitude of anchorage force, for example, the tooth shall not bear anchorage force in a certain direction, or the tooth shall not bear anchorage force that exceeds a predetermined value.

For example, in some embodiments, due to the smooth surface of an implanted tooth, a shell-shaped repositioner's ability of holding on it may be compromised, in such case, the implanted tooth is generally more suitable to serve as an ordinary anchorage rather than a strong anchorage. The Inventor of the present application discovered that in one embodiment, the anchorage force that a strong anchorage can bear may be 2-5 times that of an ordinary anchorage. Therefore, such a restriction on anchorage force bearing can be given to an implanted tooth among a group of teeth to be aligned that it is an ordinary anchorage and anchorage forces borne by it during orthodontic treatment shall not exceed a preset value.

For example, in some embodiments, for teeth with periodontal disease, gingival is lower, area of periodontal tissue is smaller, and remodel of alveolar bone is slow, as a result, the maximum anchorage force such a tooth can bear might be only ⅓-½ of an ordinary anchorage. Therefore, a restriction on anchorage force bearing can be given to teeth with periodontal disease among a group of teeth to be aligned that the maximum anchorage force such teeth can bear is ⅓-½ that of an ordinary anchorage.

For example, in some embodiments, it is necessary to prevent a tooth to be repositioned from being subject to an anchorage force opposite to the movement direction (namely, the repositioning direction). Therefore, such a restriction on anchorage force bearing can be given to the tooth that the anchorage force component opposite to the movement direction shall be smaller than or equal to zero.

Inspired by the present application, it is understood that restrictions on anchorage force bearing may be set for one or more teeth among a group of teeth to be aligned.

In 105, the second 3D digital model is modified based on the first 3D digital model, the second 3D digital model and the information of restrictions on anchorage force bearing of the first tooth, to obtain a third 3D digital model for fabricating the shell-shaped repositioner.

A shell-shaped repositioner is caused to exert forces on teeth by its elastic deformation when it is worn on the teeth, the larger the deformation, the larger the forces.

Take a conventional shell-shaped repositioner as an example, geometry of its cavity for receiving teeth substantially matches a target tooth arrangement. The larger the distance between a target position and a current position of a tooth to be repositioned, the larger the deformation of the shell-shaped repositioner when it is worn on the teeth, the larger the repositioning force the tooth to be repositioned receives, and the larger the anchorage forces anchorage teeth receive.

As compared with conventional shell-shaped repositioners, since the shell-shaped repositioner of the present application is fabricated using the third 3D digital model which is obtained by modifying the second 3D digital model, this changes the force distribution of the teeth when the shell-shaped repositioner is worn on the teeth so that the anchorage forces received by certain teeth satisfy corresponding restrictions on anchorage force bearing.

In some embodiments, the third 3D digital model can be obtained by manually modifying the second 3D digital model based on the first digital 3D model, the second 3D digital model and the information of restrictions on anchorage force bearing of the first tooth, according to a technician's experience. For example, to prevent a tooth to be repositioned from bearing an anchorage force opposite to its movement direction, the second 3D digital model may be modified in the following manner according to a technician's experience to obtain the third 3D digital model: increasing dimension of this tooth in its movement direction. As a result, when the shell-shaped repositioner fabricated using the third 3D digital model is worn on the teeth, the side of the tooth to be repositioned toward the movement direction does not contact the shell-shaped repositioner.

In some embodiments, a computer may be used to verify whether the shell-shaped repositioner to be fabricated using the third 3D digital model meets the requirements.

In some embodiments, a computer-implemented finite element analysis method may be used to verify whether the shell-shaped repositioner to be fabricated using the third 3D digital model satisfies the restrictions on anchoring force bearing of the first tooth. Please refer to China patent application No. 201610304667.X entitled "Method of Verifying Shell-shaped Dental Appliance Fabrication Process Based on Thermoplastic Forming Technique" filed by the Applicant of the present application on May 10, 2016, China patent application No. 201610304301.2 entitled by "Method of Verifying Shell-shaped Dental Appliance Fabrication Process Based on Thermoplastic Forming Technique" filed by the Applicant of the present application on May 10, 2016, China patent application No. 201710130613.0 entitled "Method of Verifying Shell-shaped Dental Appliance Fabrication Process Based on Thermoplastic Forming Technique" filed by the Applicant of the present application on Mar. 7, 2017, China patent application No. 201710130668.1 entitled "Method of Verifying Shell-shaped Dental Appliance Fabrication Process Based on Thermoplastic Forming Technique" filed by the Applicant of the present application on Mar. 7, 2017, China patent application No. 201710286619.7 entitled "Computer-aided Method of Verifying an Orthodontic Repositioner" filed by the Applicant of the present application on Apr. 27, 2017, China patent application No. 201710286752.2 entitled "Method of Optimizing Process Data of Shell-shaped Dental Appliance Fabrication Based on Thermoplastic Forming Technique" filed by the Applicant of the present application on Apr. 27, 2017, and China patent application No. 201710286751.8 entitled "Method of Optimizing Film Angle of Shell-shaped Dental Appliance Fabrication Process Based on Thermoplastic Forming Technique" filed by the Applicant of the present application on Apr. 27, 2017. These patent applications disclose a whole set of methods of analyzing shell-shaped dental appliances, that cover from fabrication to performance of the same, based on computer-aided finite element analysis, invented by the Applicant of the present application.

Figure 2:
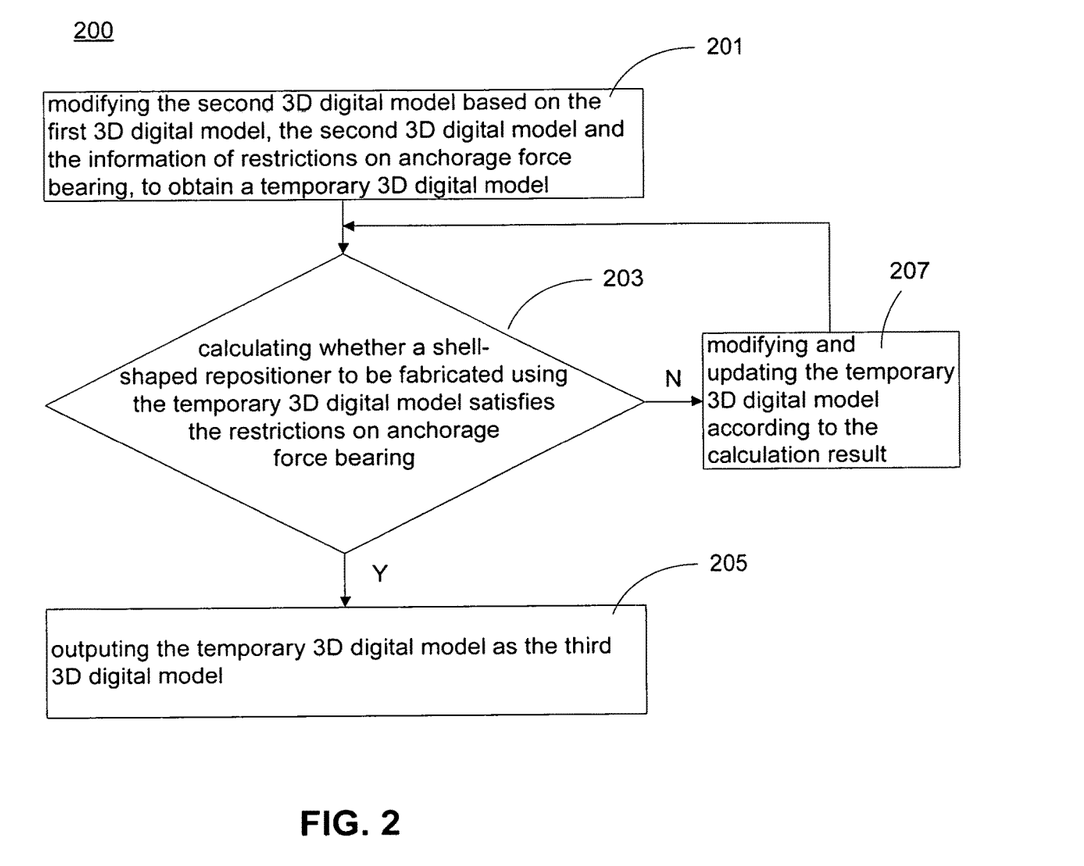
FIG. 2 illustrates a schematic flow chart of a method for generating a 3D digital model for fabricating a shell-shaped repositioner according to one embodiment of the present application.

Referring to FIG. 2, it shows a schematic flow chart of a method for generating the 3D digital model for fabricating the shell-shaped repositioner according to one embodiment of the present application.

In 201, the second 3D digital model is modified based on the first digital 3D model, the second 3D digital model and the information of restrictions on anchorage force bearing of the first tooth, to obtain a temporary 3D digital model.

There are many methods of modifying the second 3D digital model. In one embodiment, if the restriction on anchorage force bearing of the first tooth is that it shall not bear anchorage force in a first direction, the temporary 3D digital model can be obtained by dilating the first tooth of the second 3D digital model a certain distance along a second direction which is opposite to the first direction.

In one embodiment, if the restriction on anchorage force bearing of the first tooth is that it shall not bear any anchorage force at all, the temporary 3D digital model can be obtained by dilating the first tooth of the second 3D digital model on both labial and lingual sides for certain distances.

In 203, whether a shell-shaped repositioner to be fabricated using the temporary 3D digital model satisfies the restrictions on anchorage force bearing of the first tooth is calculated.

In one embodiment, for an example in which shell-shaped repositioners are fabricated using thermoplastic forming technique, a finite element model of a shell-shaped repositioner can be calculated basis the temporary 3D digital model using the finite element analysis based method of verifying shell-shaped dental appliance fabrication process based on thermoplastic forming technique developed by the Applicant of the present application. Then, a first finite element model representing teeth under the first tooth arrangement may be generated based on the first 3D digital model. After that, whether the restrictions on anchorage force bearing of the first tooth is satisfied when the finite element model of the shell-shaped repositioner is worn on the first finite element model can be determined using the finite element analysis based method for analyzing performance of shell-shaped dental appliances developed by the Applicant of the present application, and if the restrictions is satisfied, the temporary 3D digital model is qualified, if no, the temporary 3D digital model is not qualified.

In one embodiment, the first finite element model may be a rigid model, i.e., positions of its teeth remains unchanged. In this example, the force that the first tooth receives when the finite element model of the shell-shaped repositioner is worn on the first finite element model can be calculated, and based on this, whether the shell-shaped repositioner to be fabricated using the temporary 3D digital model satisfies the restrictions on anchorage force bearing of the first tooth can be determined.

In a further embodiment, the first finite element model may be a biological model, i.e., it can simulate real teeth, and a tooth in such a model might displace when subjected to a force. In this example, changes of the force received by the first tooth from the time point that the finite element model of the shell-shaped repositioner is worn on the first finite element model to a time point that an equilibrium state (the teeth of the first finite element model don't move further under the action of the finite element model of the shell-shaped repositioner) can be calculated, and based on this, it can be determined whether the force received by the first tooth during the repositioning satisfies the restrictions on anchoring force bearing.

If the temporary 3D digital model is qualified, it will jump to 205 to output the temporary 3D digital model as the third 3D digital model; otherwise, it will jump to 207.

In 207, the temporary 3D digital model is modified based on the calculation result in 203. Then, verify the modified temporary 3D digital model again, and the process is repeated until a qualified temporary 3D digital model is obtained.

Inspired by the present application, it is understood that besides finite element analysis based methods, other methods can also be used to verify the temporary 3D digital model, for example, methods that utilize force sensors or thin film pressure sensors to measure forces, or methods that utilize pressure-sensitive papers to perform measurement in clinical tests, or methods developed basis big data algorithms using available mechanical experiment results.

In 107, the third 3D digital model is used to control an apparatus to fabricate the shell-shaped repositioner.

In some embodiments, a fourth 3D digital model representing the shell-shaped repositioner may be generated based on the third 3D digital model, and then the fourth 3D digital model may be used to control an apparatus to directly fabricate the shell-shaped repositioner. For example, the fourth 3D digital model may be used to control a 3D printing apparatus to directly fabricate the shell-shaped repositioner. In another example, the fourth 3D digital model may be used to control a computer numerical control machine to cut a blank to obtain the shell-shaped repositioner.

Figure 3:
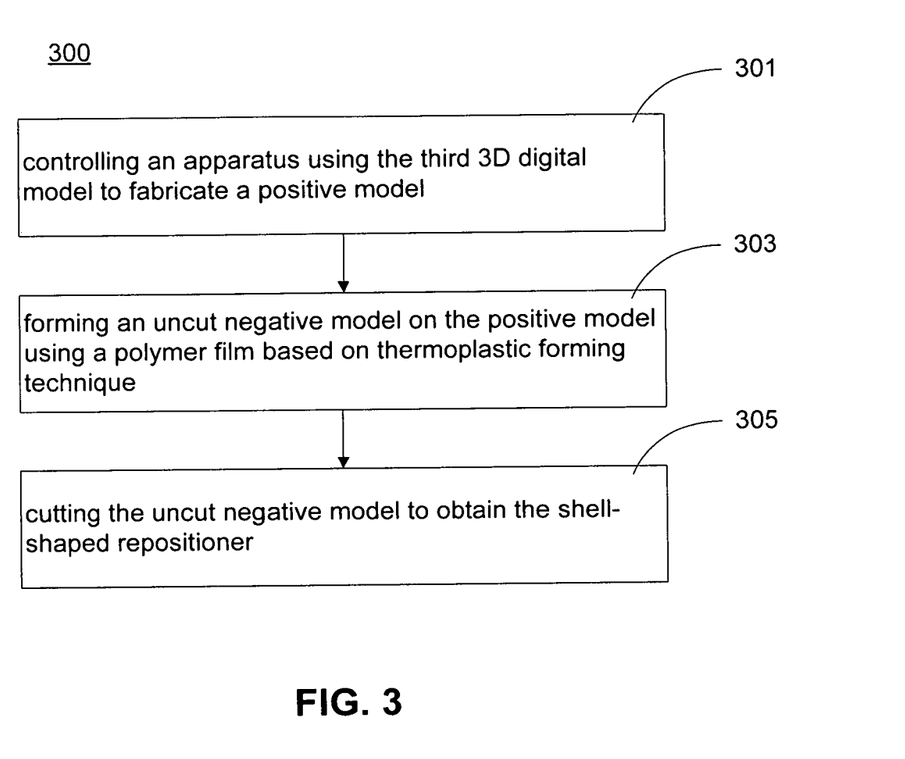
FIG. 3 illustrates a flow chart of a method for fabricating a shell-shaped repositioner based on thermoplastic forming technique according to one embodiment of the present application.

In some embodiments, the shell-shaped repositioner may be fabricated based on thermoplastic forming technique. Referring to FIG. 3, it illustrates a flow chart of a method 300 for fabricating the shell-shaped repositioner based on thermoplastic forming technique according to one embodiment of the present application.

In 301, the third 3D digital model is used to control an apparatus to fabricate a positive model of teeth.

In some embodiments, the third 3D digital model may be used to control a stereolithographic apparatus to fabricate the positive model of teeth.

In some embodiments, the third 3D digital model may be used to control a 3D printing apparatus to fabricate the positive model of teeth.

In some embodiments, the third 3D digital model may be used to control a computer numerical control machine to cut a blank to fabricate the positive model of teeth.

Technics of fabricating positive models of teeth are well-known in the industry, and will not be enumerated and described in detail any more here.

In 303, an uncut negative model is formed on the positive model of teeth using thermoplastic forming technique with a polymer thin film.

The fabrication of the shell-shaped dental appliance based on thermoplastic forming technique is well-known in the industry, and it will not be described in detail any more.

In 305, the uncut negative model is cut to obtain the shell-shaped repositioner.

After the uncut negative model is obtained, it needs to be trimmed to remove unnecessary parts. For example, a cutting line may be determined within an area 3 mm either side of the gingival line, more preferably within an area 0.5-1 mm from the gingival line to the side adjacent to the gingiva.

As those skilled in the art know, orthodontic treatment using shell-shaped repositioners generally requires a plurality of successive shell-shaped repositioners for respective treatment steps. Inspired by the present application, it is understood that the restrictions on anchorage force bearing set for a tooth may not vary in the whole orthodontic treatment procedure or may vary with steps, depending on specific situations.

Two examples of the shell-shaped repositioner fabricated using the method of the present application will be described below.

Figure 4A:
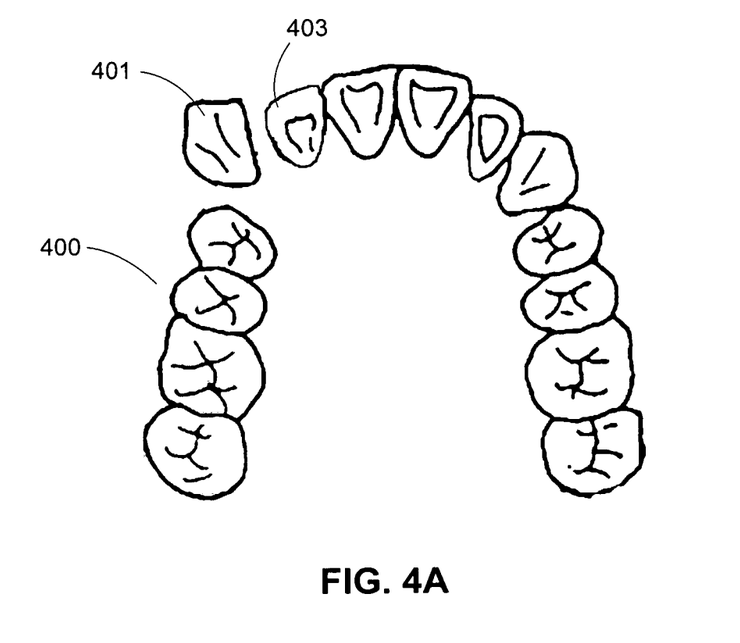
FIG. 4A schematically illustrates a dentition under a target tooth arrangement according to one embodiment of the present application.

Referring to FIG. 4A, it schematically illustrates dentition 400 under a target tooth arrangement (a target tooth arrangement of one step) according to one embodiment of the present application.

In an exemplary orthodontic treatment, in the current treatment step, both adjacent teeth 401 and 403 need to move towards lingual side. According to experience, when a conventional shell-shaped repositioner is used for orthodontic treatment, usually the teeth adjacent to the tooth to be repositioned might become its major anchorage. In this example, tooth 401 receives an anchorage force towards labial side while it receives a repositioning force towards lingual side, to provide anchorage for tooth 403 to move towards lingual side. However, this will reduce the moving/repositioning efficiency of tooth 401.

To solve this problem, such restrictions on anchorage force bearing may be set for tooth 401: not to bear anchorage force towards lingual side. Then, the 3D digital model representing the target tooth arrangement of dentition 400 may be modified (in this example, by modifying the 3D digital model of tooth 401 only) based on the 3D digital models respectively representing the initial tooth arrangement and the target tooth arrangement of dentition 400 and the information of the restrictions on anchorage force bearing, to obtain the 3D digital model for fabricating the shell-shaped repositioner.

Figure 4B:
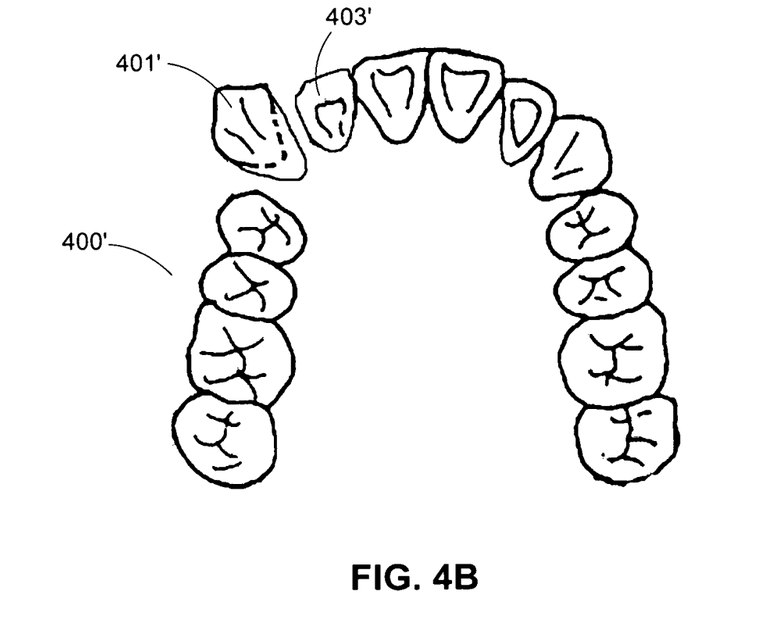
FIG. 4B schematically illustrates a 3D digital model for fabricating a shell-shaped repositioner according to one embodiment of the present application.

Referring to FIG. 4B which schematically illustrates a 3D digital model for fabricating the shell-shaped repositioner, namely, the 3D digital model of dentition 400', obtained by modifying the 3D digital model of dentition 400 shown in FIG. 4A, according to one embodiment of the present application.

Teeth 401' and 403' correspond to teeth 401 and 403 in FIG. 4A, respectively. By comparison, it can be seen that tooth 401' is obtained by dilating tooth 401 a certain distance towards lingual side, where the dotted line delineates the profile of tooth 401.

Figure 4C:
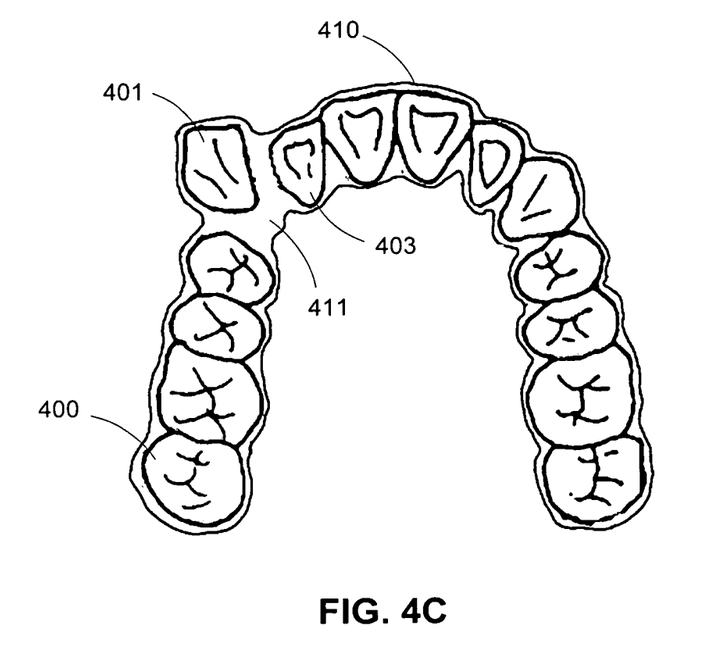
FIG. 4C schematically illustrates relationship between the dentition shown in FIG. 4A and the shell-shaped repositioner fabricated using the 3D digital model shown in FIG. 4B when the repositioner is worn on the dentition according to one embodiment of the present application.

Referring to FIG. 4C, it schematically illustrates relationship between the shell-shaped repositioner 410, fabricated using the 3D digital model shown in FIG. 4B, and dentition 400 under the target tooth arrangement shown in FIG. 4A, when the former is worn on the latter.

When the shell-shaped repostioner 410 is worn on dentition 400 under the target tooth arrangement, there is a gap 411 between a part of the lingual side sidewall of the shell-shaped repositioner 410, which part corresponds to tooth 401, and tooth 401 such that tooth 401 is not subject to anchorage force towards labial side when dentition 400 are repositioned from the initial tooth arrangement to the target tooth arrangement, therefore, its movement efficiency can be ensured.

Figure 5A:
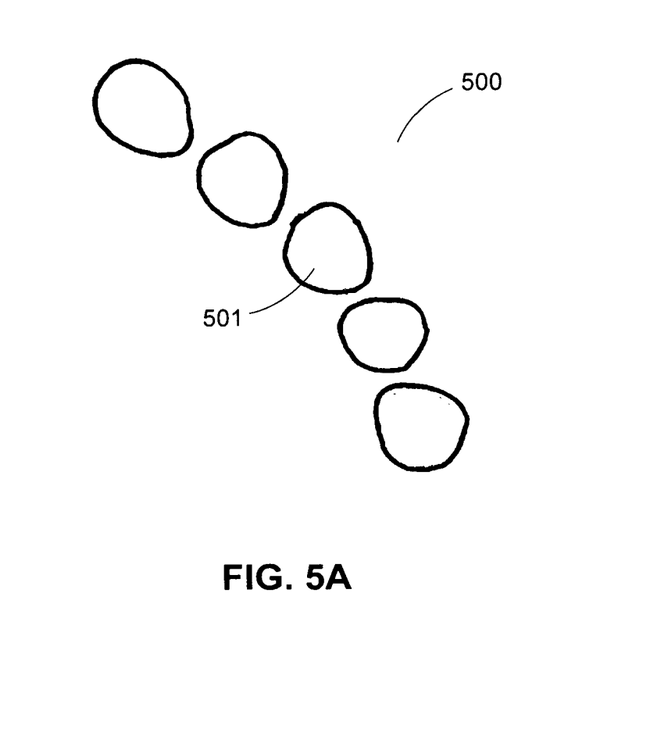
FIG. 5A schematically illustrates a dentition under a target tooth arrangement according to one embodiment of the present application.

Referring to FIG. 5A which schematically illustrates a partial dentition 500 under a target tooth arrangement (the initial tooth arrangement of a treatment step) according to one embodiment of the present application.

In this example, for specific reasons, during the repositioning of the partial dentition 500, it is desirable that tooth 501 does not bear any anchorage force. Hence, such restrictions on anchorage force bearing can be set for tooth 501: not to bear any anchorage force.

Then, the 3D digital model representing the target tooth arrangement of dentition 500 may be modified according to the above method (in this example, by modifying the 3D digital model of tooth 501 only) based on the 3D digital models respectively representing the initial tooth arrangement and the target tooth arrangement of dentition 500 and the information of the restrictions on anchorage force bearing, to obtain the 3D digital model for fabricating the shell-shaped repositioner.

Figure 5B:
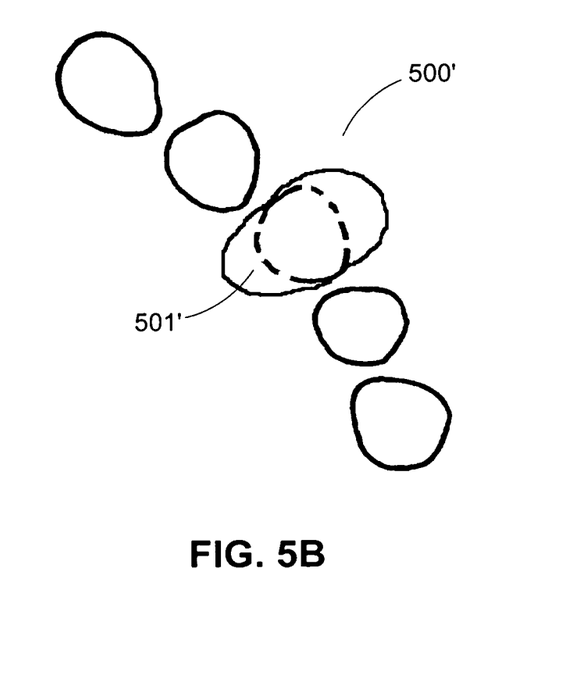
FIG. 5B schematically illustrates a 3D digital model for fabricating the shell-shaped repositioner according to one embodiment of the present application.

Referring to FIG. 5B which schematically illustrates a 3D digital model for fabricating the shell-shaped repositioner, namely, a 3D digital model of dentition 500', obtained by modifying the 3D digital model of dentition 500 shown in FIG. 5A, according to one embodiment of the present application.

Tooth 501' corresponds to tooth 501 shown in FIG. 5A. By comparison, it can be seen that tooth 501' is obtained by dilating tooth 501 on both lingual side and labial side for certain distances, where the dotted line delineates the profile of tooth 501.

Figure 5C:
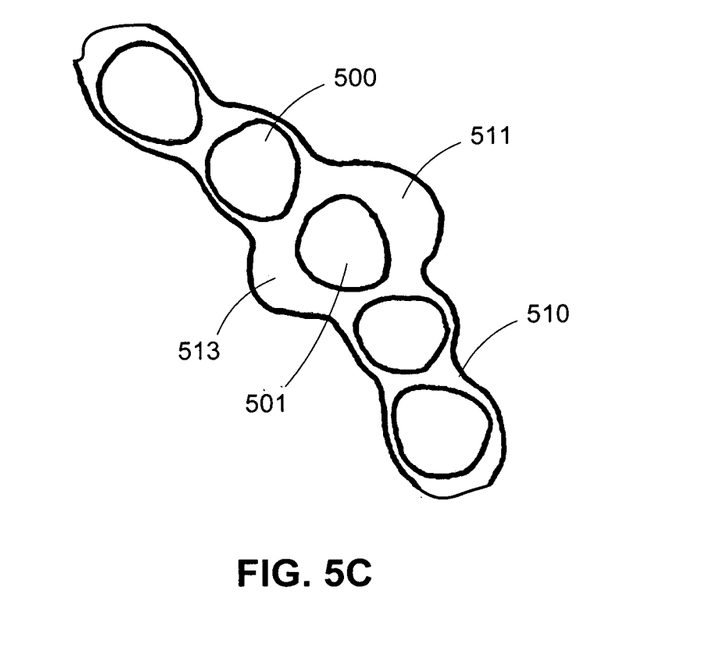
FIG. 5C schematically illustrates relationship between the dentition shown in FIG. 5A and the shell-shaped repositioner fabricated using the digital 3D model shown in FIG. 5B when the repositioner is worn on the dentition according to one embodiment of the present application.

Referring to FIG. 5C, it schematically illustrates the relationship between the shell-shaped repositioner 510, fabricated using the 3D digital model shown in FIG. 5B, and dentition 500 under the target tooth arrangement shown in FIG. 5A, when the former is worn on the latter.

When the shell-shaped repostioner 510 is worn on dentition 500 under the target tooth arrangement, there are gaps 511 and 513 between parts of lingual side and labial side sidewall of the shell-shaped repositioner 510, which parts correspond to tooth 501, and tooth 501 such that tooth 501 is not subject to any anchorage force towards lingual side or labial side when dentition 500 is repositioned from the initial tooth arrangement to the target tooth arrangement by the shell-shaped repositioner 510.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Additionally, with regard to flow diagrams, operational descriptions and method claims, the order in which the blocks are presented herein shall not mandate that various embodiments be implemented to perform the recited functionality in the same order unless the context dictates otherwise.

Unless the context dictates, terms used herein are generally intended as "open" terms instead of limiting. The use of phrases such as "one or more", "at least" and "but not limited to" should not be construed to imply that the parts of the present application that do not use similar phrases intend to be limiting.

We claim:

1. A method of fabricating a shell-shaped repositioner for repositioning teeth from a first tooth arrangement to a second tooth arrangement, comprising:

obtaining a first 3D digital model representing the first tooth arrangement, a second 3D digital model representing the second tooth arrangement and information of restrictions on anchorage force bearing of a first tooth among the teeth;

modifying the second 3D digital model based on the first 3D digital model and the information of restrictions on anchorage force bearing of the first tooth, to obtain a third 3D digital model, wherein the second 3D digital model is modified by modifying three dimensional geometry of 3D digital model of the first tooth; and controlling an apparatus using the third 3D digital model to fabricate the shell-shaped repositioner, wherein said modifying the second 3D digital model based on the first 3D digital model and the information of restrictions on anchorage force bearing of the first tooth, to obtain a third 3D digital model comprises:

calculating an anchorage force applied to the first tooth by a shell-shaped repositioner to be fabricated using the second 3D digital model;

determining whether the calculated anchorage force complies with the restrictions on anchorage force bearing; and if the calculated anchorage force complies with the restrictions on anchorage force bearing, determining the second 3D digital model as the third 3D digital model, and if the calculated anchorage force does not comply with the restrictions on anchorage force bearing, modifying and updating the second 3D digital model based on the restrictions on anchorage force bearing and the calculated anchorage force.

2. The method of claim 1, wherein the restrictions restrict at least one of direction and magnitude of anchorage force borne by the first tooth, during the repositioning of the teeth from the first tooth arrangement to the second tooth arrangement.

3. The method of claim 2, wherein the 3D digital model of the first tooth is modified by dilating it toward a certain direction by a certain distance.

4. The method of claim 3, wherein the restrictions comprise: anchorage force in a first direction borne by the first tooth shall be smaller than a predetermined value, and the 3D digital model of the first tooth is modified by dilating it toward a second direction opposite to the first direction.

5. The method of claim 4, further comprising:
controlling an apparatus using the third 3D digital model to fabricate a positive model;
forming an uncut negative model of the positive model using a polymer film based on thermoplastic forming technique; and
cutting off unnecessary parts of the uncut negative model to obtain the shell-shaped repositioner.

6. The method of claim 1, wherein the calculation is based on finite element analysis.

7. A shell-shaped repositioner fabricated by the method of claim 1, the repositioner being one-piece shell-shaped and comprising a cavity for receiving a plurality of teeth, the cavity having a geometry that enables the repositioner to reposition the plurality of teeth from a first tooth arrangement to a second tooth arrangement, and the geometry of the cavity being configured in such a way that force received by a first tooth during the repositioning of the plurality of teeth from the first tooth arrangement to the second tooth arrangement satisfies restrictions on anchorage force bearing preset for the first tooth.

8. The shell-shaped repositioner of claim 7, wherein the size of a part of the cavity which corresponds to the first tooth is larger than that of the first tooth.

9. The shell-shaped repositioner of claim 7, wherein the restrictions comprise: anchorage force in a first direction borne by the first tooth shall be smaller than a predetermined value, and the geometry of the cavity is such that there is a gap between sidewall opposite to the first direction of the shell-shaped repositioner and the first tooth when the repositioner is worn on the plurality teeth under the second tooth arrangement.

* * * * *